(12) United States Patent
Björkman et al.

(10) Patent No.: US 11,548,497 B2
(45) Date of Patent: Jan. 10, 2023

(54) METHOD AND SYSTEM FOR PROPELLING A VEHICLE

(71) Applicant: Scania CV AB, Södertälje (SE)

(72) Inventors: Mathias Björkman, Tullinge (SE); Afram Kourie, Södertälje (SE)

(73) Assignee: Scania CV AB, Södertälje (SE)

( * ) Notice: Subject to any disclaimer, the term of this patent is extended or adjusted under 35 U.S.C. 154(b) by 347 days.

(21) Appl. No.: 16/619,403

(22) PCT Filed: Jun. 1, 2018

(86) PCT No.: PCT/SE2018/050558
§ 371 (c)(1),
(2) Date: Dec. 4, 2019

(87) PCT Pub. No.: WO2018/226142
PCT Pub. Date: Dec. 13, 2018

(65) Prior Publication Data
US 2020/0180601 A1 Jun. 11, 2020

(30) Foreign Application Priority Data
Jun. 7, 2017 (SE) .................................... 1750713-8

(51) Int. Cl.
*B60W 30/182* (2020.01)
*B60W 20/19* (2016.01)
(Continued)

(52) U.S. Cl.
CPC ............ *B60W 20/19* (2016.01); *B60W 10/06* (2013.01); *B60W 10/08* (2013.01);
(Continued)

(58) Field of Classification Search
CPC ...... B60W 20/19; B60W 10/06; B60W 10/08; B60W 30/182; B60W 30/188;
(Continued)

(56) References Cited

U.S. PATENT DOCUMENTS 8,197,383 B2  6/2012  Sumilla
8,499,867 B2  8/2013  Marcacci et al.
(Continued)

FOREIGN PATENT DOCUMENTS

CN  101500873 A  8/2009
CN  104527399 A  4/2015
(Continued)

OTHER PUBLICATIONS

Scania CV AB, International Application No. PCT/SE2018/050558, International Search Report, dated Jul. 18, 2018.
(Continued)

*Primary Examiner* — Justin Holmes
(74) *Attorney, Agent, or Firm* — Moore & Van Allen PLLC; W. Kevin Ransom

(57) ABSTRACT

The invention relates to a method for propelling a vehicle comprising a first power source being an internal combustion engine and a second power source comprising at least one electrical machine. The vehicle is configured to be selectively driven according to a first mode and a second mode, wherein said second mode is prioritized more in relation to fuel efficiency of said vehicle than said first mode. When a maximum power for propelling said vehicle is requested, power delivered by said first power source and said second power source is controlled such that the total power delivered by said first and said second power source exceeds the maximum deliverable power of said first power source. The total power delivered by said first and said second power source is allowed to exceed the maximum deliverable power of said first power source when said vehicle is driven according to said second mode.

16 Claims, 4 Drawing Sheets

(51) Int. Cl.
  *B60W 10/06* (2006.01)
  *B60W 10/08* (2006.01)
  *B60W 50/08* (2020.01)
  *B60W 30/188* (2012.01)
  *B60W 50/14* (2020.01)

(52) U.S. Cl.
  CPC ........ *B60W 30/182* (2013.01); *B60W 30/188* (2013.01); *B60W 50/082* (2013.01); *B60W 50/14* (2013.01); *B60W 2050/146* (2013.01); *B60W 2510/244* (2013.01); *B60W 2540/10* (2013.01); *B60W 2540/103* (2013.01); *B60W 2540/215* (2020.02); *B60W 2710/0677* (2013.01); *B60W 2710/086* (2013.01); *B60W 2710/244* (2013.01); *B60W 2720/106* (2013.01)

(58) Field of Classification Search
  CPC ............... B60W 50/082; B60W 50/14; B60W 2050/146; B60W 2510/244; B60W 2540/10; B60W 2540/103; B60W 2540/215; B60W 2710/0677; B60W 2710/086; B60W 2710/244; B60W 2720/106; B60W 2710/1005; B60W 10/11; B60W 20/10; B60W 50/08; Y02T 10/62; B60K 2006/4825; B60K 6/48; B60K 6/24; B60K 6/26; B60Y 2200/92
  See application file for complete search history.

(56) References Cited

U.S. PATENT DOCUMENTS

| 2005/0054479 | A1 | 3/2005 | Masterson et al. |
| 2013/0158756 | A1 | 6/2013 | Yamazaki et al. |
| 2014/0163792 | A1 | 6/2014 | Kim |
| 2014/0288757 | A1 | 9/2014 | Hirasawa et al. |
| 2015/0197243 | A1* | 7/2015 | Johri ..................... B60W 20/12 180/65.265 |
| 2015/0233304 | A1 | 8/2015 | Hara et al. |
| 2015/0283994 | A1 | 10/2015 | Matsumoto et al. |
| 2016/0152227 | A1 | 6/2016 | Tabata et al. |
| 2016/0200315 | A1 | 7/2016 | Fracchia et al. |

FOREIGN PATENT DOCUMENTS

| CN | 104773161 A * | 7/2015 | ............ B60W 10/06 |
| DE | 102009046368 A1 | 5/2011 | |
| EP | 2792561 A1 | 10/2014 | |
| FR | 2996510 A1 | 4/2014 | |
| GB | 2483371 A | 3/2012 | |
| GB | 2510939 A | 8/2014 | |
| JP | 09-233607 A | 9/1997 | |
| WO | WO-2008145263 A1 * | 12/2008 | ............... B60K 6/48 |
| WO | 2015032345 A1 | 3/2015 | |
| WO | 2015198047 A2 | 12/2015 | |

OTHER PUBLICATIONS

Scania CV AB, International Application No. PCT/SE2018/050558, Written Opinion, dated Jul. 18, 2018.

Scania CV AB, International Application No. PCT/SE2018/050558, International Preliminary Report on Patentability, dated Dec. 10, 2019.

Scania CV AB, Korean Patent Application No. 10-2019-7036559, Office Action, dated Feb. 2, 2021.

Scania CV AB, European Application No. 18813934.9, Extended European Search Report, dated Jan. 11, 2021.

Scania CV AB, European Patent Application No. 18813934.9, Communication pursuant to Article 94(3) EPC, dated May 24, 2022.

Scania CV AB, Chinese Patent Application No. 201880035855.4, First Office Action, dated Jun. 1, 2022.

* cited by examiner

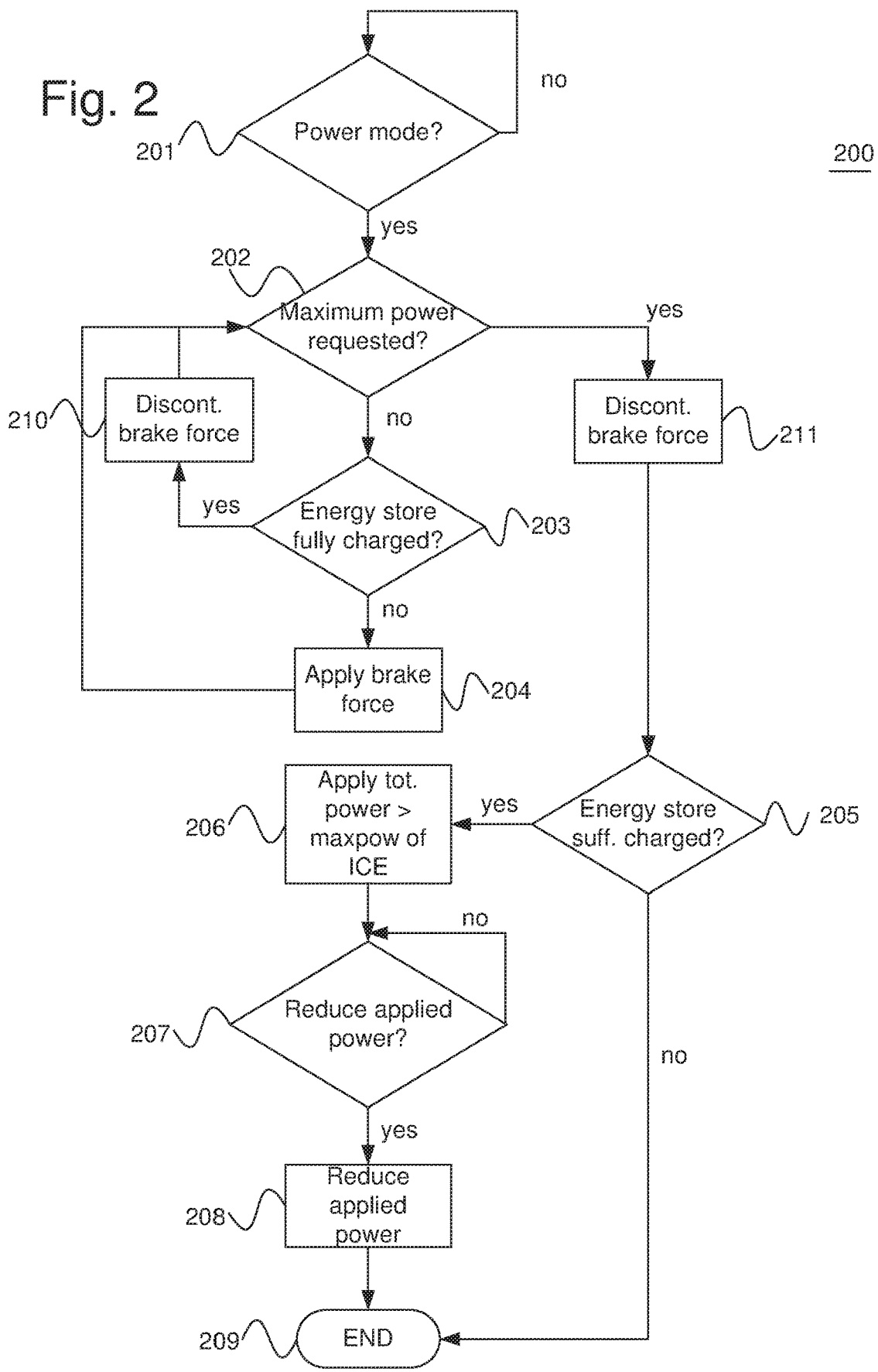

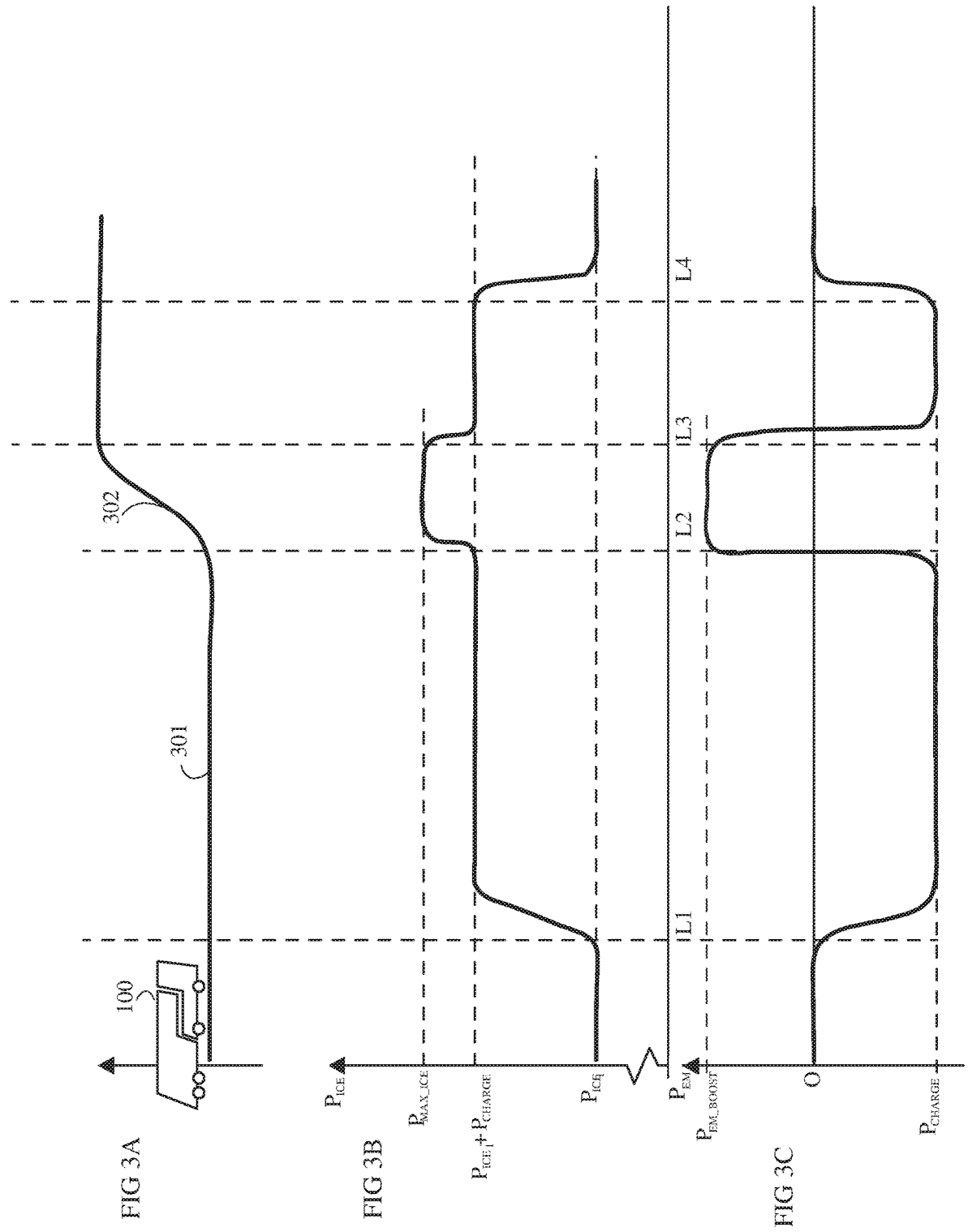

METHOD AND SYSTEM FOR PROPELLING A VEHICLE

CROSS-REFERENCE TO RELATED APPLICATION(S)

This application is a national stage application (filed under 35 § U.S.C. 371) of PCT/SE2018/050558, filed Jun. 1, 2018 of the same title, which, in turn, claims priority to Swedish Application No. 1750713-8 filed Jun. 7, 2017; the contents of each of which are hereby incorporated by reference.

FIELD OF THE INVENTION

The present invention relates to vehicles, and in particular to a method and system for propelling a vehicle. The present invention also relates to a vehicle, as well as a computer program and a computer program product that implement the method according to the invention.

BACKGROUND OF THE INVENTION

With regard to vehicles in general, and at least to some extent heavy/commercial vehicles, such as trucks, buses and the like, there is an ongoing research and development with regard to increasing fuel efficiency and reducing exhaust emissions.

This is often at least partly due to growing governmental concerns in pollution and air quality, e.g. in urban areas, which has also led to the adoption of various emission standards and rules in many jurisdictions.

Apart from governmental concerns, one of the main expenses associated with vehicle operation is consumption of fuel for propulsion of the vehicle. The degree of utilization of heavy vehicles is often high, and with its associated fuel consumption, the cost of fuel can affect the profitability of the owner of the vehicle to a great extent.

In view of this, alternatives to the sole use of conventional combustion engine technology in a vehicle are increasingly being considered.

For example, hybrid-electric vehicles are undergoing extensive research and development. These vehicles include an electrical machine, which may be utilized to provide power for propelling the vehicle.

Commercial vehicles are often used for transportation of goods from one location to another, and, in general, spend a lot of time travelling on roads, for which reason a lot of effort in research and development with regard to such vehicles is spent on methods for reducing fuel consumption. However, in addition to reducing fuel consumption, efforts are also made to make driving of the vehicle comfortable to the driver, since in general in particular commercial vehicles sell at least partly on aspects being considered important from a driver point of view.

SUMMARY OF THE INVENTION

It is an object of the present invention to provide a method and system that allows further use of the vehicle drivetrain to thereby e.g. reduce vehicle travel time when this is desired.

According to the present invention, it is provided a method for propelling a vehicle,
 i. the vehicle including:
 ii. a first power source configured to selectively provide a controllable power to propel at least one drive wheel of said vehicle, the first power source being an internal combustion engine;
 iii. a second power source configured to selectively provide a controllable power to propel at least one drive wheel of said vehicle, the second power source comprising at least one electrical machine;
 iv. the vehicle being configured to be selectively driven according to a first mode and a second mode, where, when said vehicle is driven in said second mode, providing power for propelling said vehicle is prioritized more in relation to fuel efficiency of said vehicle than when said vehicle is driven according to said first mode,
 v. the method including, when a maximum power for propelling said vehicle is requested:
 vi. controlling power delivered by said first power source and said second power source such that the total power delivered by said first and said second power source exceeds the maximum deliverable power of said first power source, wherein power delivered by said first power source and said second power source is controlled such that the total power delivered by said first and said second power source exceeds the maximum deliverable power of said first power source when said vehicle is being driven according to said second mode.

The vehicle may comprise driver controllable means for actively requesting power for propelling the vehicle.

The maximum power for propelling said vehicle may requested by a driver of the vehicle.

According to embodiments of the invention, the vehicle comprises an energy store for storing energy for powering the second power source.

According to embodiments of the invention, the energy store may be charged by regenerative braking using the second power source.

According to embodiments of the invention, the vehicle is a parallel hybrid electric vehicle and/or power-split hybrid vehicle, or other hybrid vehicle where both an internal combustion engine and an electrical machine provide mechanical power to one or more vehicle drive wheels.

According to embodiments of the invention, the vehicle is a heavy commercial I vehicle.

It is common that vehicles, such as commercial vehicles, comprise a drive mode selector for selecting different drive modes, and the present invention relates to vehicles of this kind. The drive mode may tune functions of the vehicle to optimize more the propulsion of the vehicle in relation to one or more parameters at the expense of other parameters, where the preference in parameters to optimize towards may be indicated by the driver using the drive mode selector.

For example, an economy mode, a standard driving mode and a power mode may be selectable by a driver. When the vehicle is being driven in economy mode, propulsion of the vehicle may be tuned to consume less fuel at the possible expense of e.g. a prolonged trip time in relation to other modes. For example, in economy mode, engine response in relation to manoeuvring of the accelerator may be set to be less aggressive in relation to a standard or power mode, i.e. the internal combustion engine is controlled to deliver less power for a given accelerator position in relation to other drive modes. Also, e.g. higher than normal deviations from a set vehicle speed may be utilized to allow the vehicle to lose speed to a higher extent when going uphill in order to thereby attempt to reduce fuel consumption. Also, e.g. a maximum allowed speed of the vehicle may be reduced in comparison to other driving modes. Requests, such as driver requests for maximum power from e.g. an internal combustion engine, e.g. by performing a kickdown, may also be disabled.

With regard to a standard driving mode, such a mode may constitute an all-round mode optimized to provide a satisfactory fuel economy, while still delivering e.g. good hill climbing performance and a more aggressive engine response in relation to the economy mode. For example, the vehicle control system when in standard mode may strive to run the engine at maximum torque during hill climbing.

Vehicles may also be equipped with a power mode, where, when power mode is selected, the vehicle propulsion may be controlled with reduced transportation time as a primary priority e.g. at the expense of a higher fuel consumption. In comparison e.g. to an economy mode and standard mode, engine response may be comparatively more aggressive, i.e. the internal combustion engine may be controlled to deliver more power in a shorter period of time than when the vehicle is being driven in another mode than power mode. The vehicle may be allowed to continue on a selected gear to higher speeds of rotation of the internal combustion engine prior to a change of gear is performed, and uphill performance may be optimized by striving to run the engine at maximum power of the internal combustion engine.

The present invention relates to hybrid vehicles, in particular parallel hybrid electric vehicles, where at least a first and a second driver selectable driving modes are available, where when the vehicle is driven in the second mode, providing power for propelling the vehicle is prioritized more in relation to fuel efficiency of said vehicle than when said vehicle is driven according to the first mode.

With regard to hybrid electric vehicles where both an internal combustion engine and at least one electrical machine provide mechanical power to vehicle drive wheels, such as e.g. heavy commercial hybrid electric vehicles of this kind, irrespective of selected drive mode, the total power that is provided by the vehicle power sources may be controlled such that power being delivered to the vehicle drive wheels do not exceed the power that the internal combustion engine maximally may deliver. That is, any power provided by the electrical machine may be arranged to be compensated for by a corresponding reduction in power delivered by the internal combustion engine. In this way, activation and deactivation of the hybrid drive may occur without the driver noticing, i.e. the vehicle will behave in the same manner as if it did not at all comprise a hybrid drive but only an internal combustion engine.

In this way, the vehicle may always behave as expected by the driver. This is in general also a general desire.

According to the invention, on the other hand, the total delivered power is increased by controlling power delivered by the first power source and the second power source such that the total combined power delivered by the first and the second power source exceeds the maximum deliverable power of the first power source. That is, according to the invention, the total power delivered to the vehicle drive wheels is allowed to exceed the maximum power that the vehicle internal combustion engine is capable to maximally deliver.

This may be arranged to be performed when there is a maximum request for power, irrespective of whether the vehicle currently is being driven according to the first mode or the second mode. According to embodiments, however, this is only performed when the vehicle is being driven according to said second mode. That is, for as long as the vehicle is being driven in the first mode, the maximum combined power delivered by the internal combustion engine and the electrical machine may be controlled to at most equal the maximum deliverable power of the internal combustion engine also when maximum power is requested.

Furthermore, in the second mode, the power being delivered by said first power source and said second power source may be controlled such that the total delivered power exceeds the maximum deliverable power of said first power source also when a power being less than maximum power for propelling said vehicle is requested. That is, when the vehicle driven according to the second mode, a power that exceeds the maximum deliverable power of said first power source may be provided e.g. for requests for power exceeding some suitable predetermined request.

Also, a power that exceeds the maximum deliverable power of said first power source may be provided in the second mode when the current driving resistance is higher than what can be overcome by the internal combustion engine delivering maximum power, and when the request for power indicates a desire to overcome the driving resistance, e.g. by an accelerator being depressed to a predetermined extent, or e.g. a cruise control system requesting power exceeding the maximum torque that the internal combustion engine can deliver.

Hence according to the invention, more power may be made available to the driver than e.g. the rated power of the vehicle, which may be the maximum deliverable power of the internal combustion engine. Propulsion of the vehicle in situations when the additional power is available may thereby also be perceived by the driver as a vehicle being equipped with an internal combustion engine that is more powerful than the stated engine power rating of the vehicle.

When controlling the first and second power source such that the combined power delivered by the first and second power source exceeds the total deliverable power of the first power source it may, according to embodiments of the invention, be determined if a change of gear to a lower gear increases the total deliverable power of said first power source and said second power source at a current vehicle speed.

This may be the case, for example, if a change of gear to a lower gear may be performed to increase the speed of rotation of the internal combustion engine. It may, however, also be that the electrical machine may provide higher power at a higher speed of rotation. The determination of whether a change of gear may increase power may hence take into account deliverable power of both the first power source and the second power source at the one or more possible gear alternatives. According to embodiments of the invention, only the first or the second power source is taken into account. The determination may also be arranged to take the current charge level of an energy store powering the second power source into account.

When it is determined that a change of gear to a lower gear may increase deliverable power, a change gear to the lower gear may be performed to increase the power delivered by the internal combustion engine and/or electrical machine. This, in turn, increases the total combined power that currently can be applied by the first and second power source, so that either a higher power can be applied, or less power need to be applied by the electrical machine, e.g. to reduce power consumption of the electrical machine and thereby increase the period of time during which a total power exceeding the maxim deliverable power of the internal combustion engine may be applied.

When a change of gear to any one of plurality of lower gears will increase deliverable power of the first power source at a current vehicle speed a change gear may be performed to a gear of the plurality of gears where deliverable power of the first power source is highest at the current vehicle speed. Alternatively, or in addition, the change of gear may be performed to a gear of said plurality of gears where a higher delivered power of said first power source is estimated to be maintained for a longer period of time in comparison to at least one other of said plurality of gears. That is, the gear may be selected on the basis of the expected period of time that the vehicle will be propelled on the new gear before a further change of gear is required.

According to embodiments of the invention, a lower gear for which it is estimated that vehicle propulsion may be maintained for at least a predetermined period of time is selected in order to avoid undesirably frequent changes of gear.

When applying a combined power exceeding the deliverable power of the internal combustion engine, the power delivered by the electrical machine may be controlled such that the combined power is controlled towards a predetermined power level. Thereby the vehicle may be controlled towards delivering constant power irrespective of power currently delivered by the first power source as long as the deliverable power of the second power source is sufficient to reach the predetermined power level.

According to embodiments of the invention, the second power source is controlled to always deliver a power being less than the maximum deliverable power of the second power source. This may be the case also when the combined power is controlled towards a predetermined power level as discussed above. This can be utilized e.g. to increase the possible period of time that the second power source can provide power prior to emptying an energy store for powering the second power source.

Furthermore, according to embodiments of the invention, the control of power according to the invention may be arranged to be carried out only when the second mode has been actively selected by a driver of said vehicle. For example, the second mode may be actively selected by manoeuvring of a drive mode selector.

Also, according to embodiments of the invention, the request for power is a driver request for power using driver controllable means for actively requesting power for propelling the vehicle.

According to embodiments of the invention, the request for power may also be a request for power initiated by a cruise control function of the vehicle.

According to embodiments of the invention, the vehicle is arranged to be selectively driven according to at least three driver selectable drive modes, where the plurality of drive modes may be actively selected by the driver using a drive mode selector, and where power may be arranged to be controlled according to the invention only when one of said modes is selected.

The vehicle includes an energy store, where energy of the energy store powers the second power source when said second power source provides a propelling power to a vehicle drive wheel. The second power source may also charge the energy store by applying a braking force to a vehicle wheel and/or the first power source, where brake energy can be converted to electrical energy by the second power source to charge the energy store.

When the second mode is selected it may be determined if a lower power than the maximum deliverable power of said first power source is requested for propelling said vehicle, and the second power source may be controlled to apply a brake force in order to charge the energy store when a lower power than the maximum deliverable power of said first power source is requested.

In this way, the energy store can be arranged to be charged in the second drive mode when a lower power than the maximum deliverable power of said first power source is requested, to thereby be able to provide power using the second power source when maximum power is requested. When a brake force is applied by the second power source in order to charge the energy store, the first power source may be controlled to increase delivered power by a power corresponding to the brake force applied by the second power source, such that the power delivered to the vehicle drive wheels remains essentially unchanged.

This also allows e.g. a driver to request charging by selecting power mode prior in preparation for a subsequent request for maximum power, e.g. if the driver determines that in a period of time maximum power will likely be requested.

When, in said second mode, the first and second power sources provide a power exceeding the maximum deliverable power of the first power source, power delivered by the second power source may be controlled such that the total power delivered by the first power source and the second power source exceeds the maximum deliverable power of the first power source at least during a predetermined period of time from when maximum power of said first power source is requested. In this way the driver may know that the additional power is available at least for a predetermined period of time. It may be ensured that this is possible by ensuring that a sufficient charging level of an energy store for powering the second power source prevails, and if this is not the case the additional power supplied by the second power source may not be applied at all.

According to embodiments of the invention, and/or at most during a predetermined period of time from when maximum power of said first power source is requested. In this way the driver may also know for how long the additional power is available and plan driving from this knowledge.

As was mentioned, the control of power delivered by said second power source such that the total power delivered by said first power source and said second power source exceeds the maximum deliverable power of said first power source may be arranged to be performed only if an energy level of an energy store is sufficient to provide at least a first power of the second power source for at least a predetermined period of time.

According to embodiments of the invention, the second power source is controlled to deliver different levels of power in dependence of the charging status of an energy store, so that e.g. power may be applied by the second power source at least for a predetermined period of time, but at different power levels (exceeding zero power) in dependence of the charging status of the energy store.

Furthermore, even if power is delivered by both the first and the second power source when another mode than said second mode is selected, the total power delivered by said first and second power source may be controlled to at most equal the maximum deliverable power of said first power source in such situations.

The control of power delivered by the first power source and the second power source such that the total power delivered by the first power source and the second power source exceeds the maximum deliverable power of said first power source may be arranged to be requested by, in said second mode, manoeuvring driver manoeuvrable means for requesting power to a position representing a request a maximum power from said first power source.

The driver controllable means for actively requesting power for propelling the vehicle can be movable in a movement region between a first end position and a second end position, where movement towards said second end position may represent a request for an increase in power from said first power source. Maximum power from said first power source may according to embodiments of the invention be requested by manoeuvring said driver manoeuvrable means to a position at most 5% or 10% of the total movement region from said second end position.

According to embodiments of the invention a parameter is set when the driver manoeuvrable means are manoeuvred past a predetermined position, the parameter indicating a request for maximum power. According to embodiments of the invention, the request for maximum power is defined by the vehicle driver pushing the driver manoeuvrable means such as an accelerator past a predetermined point, which may be a resistance point, e.g. activating a mechanical "kick-down" switch.

The invention may be carried out in a vehicle, and the invention also relates to a system corresponding to the method set forth above. The system is characterized in means carrying out features of the invention. Such means for carrying out features of the invention can consist of any suitable means, and the means can be specifically adapted to perform the features set forth in the system claim. Such means can consist of one or more control units, one or more computer programs, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

FIG. 2 illustrates an exemplary method according to embodiments of the invention.

FIG. 3A-C illustrates an example of power source control according to embodiments of the invention.

DETAILED DESCRIPTION OF THE INVENTION

Figures 1A, 1C:
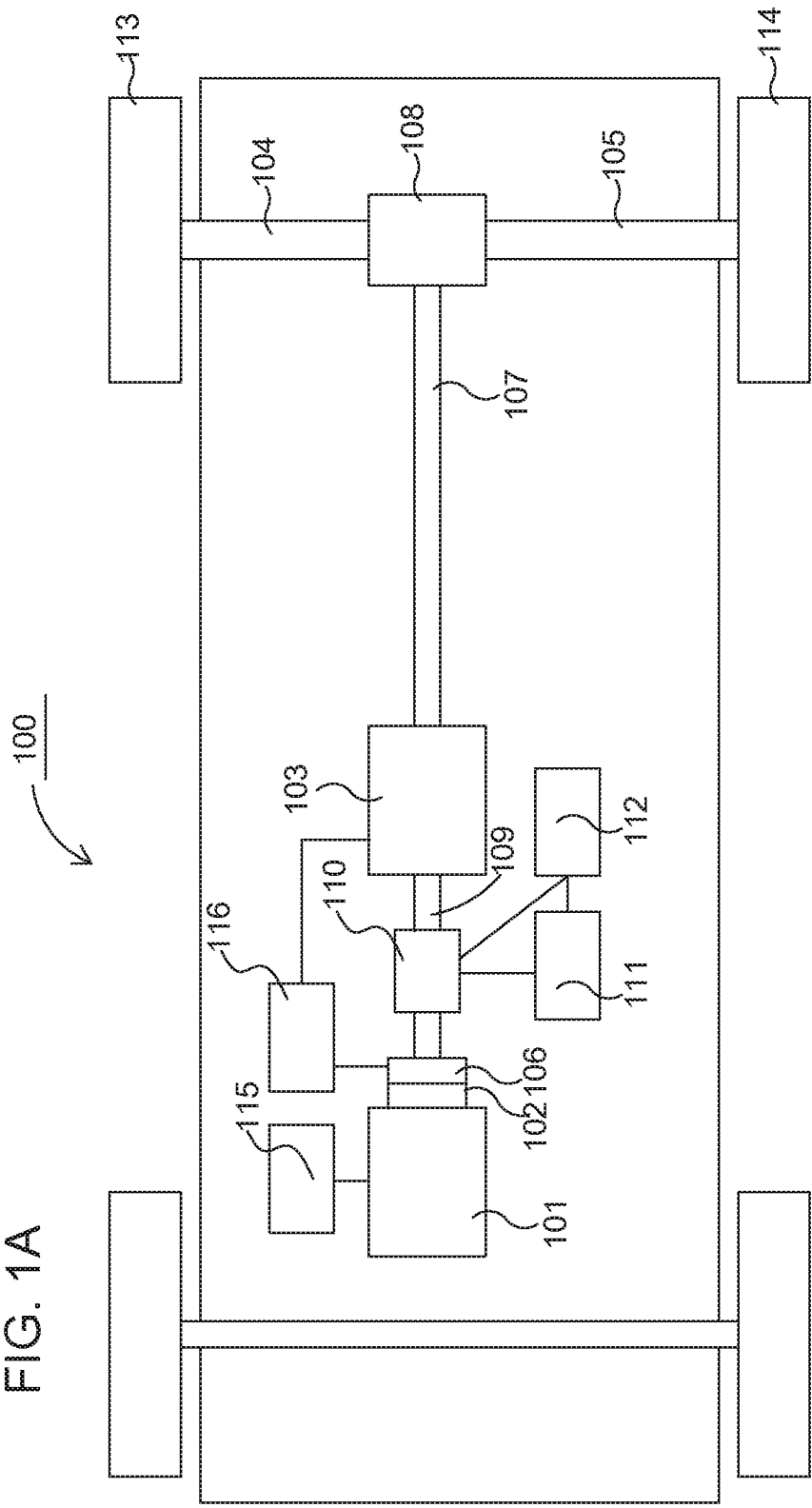
FIG. 1A illustrates a power train of an exemplary hybrid electric vehicle.
FIG. 1C illustrates an accelerator of the exemplary vehicle of FIG. 1A.

FIG. 1A schematically depicts a power train of an exemplary hybrid electric vehicle 100. The vehicle 100 in FIG. 1A is a parallel hybrid vehicle 100. The power train of the parallel hybrid vehicle in FIG. 1A comprises a combustion engine 101 which, in a conventional manner, is connected, via an output shaft of the engine 101, to a gearbox 103 via a clutch 106. The engine 101 is controlled by the vehicle's control system via a control unit/means 115. The clutch 106, which, for example, can be an automatically operated clutch, and the gearbox 103 are also controlled by the vehicle's control system by means of a control unit/means 116.

The vehicle also includes a hybrid portion with an electrical machine 110, which is connected to the input shaft 109 of the gearbox 103, downstream of the clutch 106, so that the gearbox input shaft 109 can be driven by the electrical machine 110 also when the clutch 106 is open, i.e. disengaged. Thereby, the parallel hybrid vehicle 100 can provide power, torque, to drive wheels 113, 114 from two separate power sources simultaneously, i.e. both from the combustion engine 101 and from the electrical machine 110. Alternatively, the vehicle may be propelled by one power source at a time, i.e. either by the combustion engine 101 or the electrical machine 110.

According to the present example, the internal combustion engine 101 and the electrical machine 110 provide power to the same drive wheels 113, 114. The electrical machine 110 may also apply a load to the combustion engine 101 and hence brake the internal combustion engine 101 while converting mechanical energy delivered by the internal combustion engine 101 into electric energy.

According to embodiments of the invention, the internal combustion engine 101 and electrical machine 110 may be arranged to provide power to separate drive wheels. Also, more than one electrical machine may be utilized.

The hybrid portion comprises further components. FIG. 1A depicts part of these components, and shows the electrical machine 110, an inverter drive 119 for controlling the electrical machine 110, an energy source, such as an energy storage, e.g. consisting of one or more batteries 111, and a hybrid control unit/means 112 which controls functions of the hybrid portion.

The inverter drive 119 in general, comprises switching means, e.g. in the form of transistors, to, by means of suitable switching, generate an AC voltage from a DC link/bus voltage to be supplied to the electrical machine 110. This allows e.g. amplitude and frequency of the terminal voltage of the stator phase windings to be controlled and thereby also the torque produced by and/or rotational speed of the electrical machine 110. For example, the electrical machine can be controlled to propel the vehicle while being powered from the energy store 111, but the electrical machine 110 may also be controlled to apply a brake force to the gearbox input shaft and thereby to vehicle drive wheels and/or internal combustion engine to convert brake energy into e.g. electrical energy for storage in the energy store 111 e.g. to subsequently be used to power the electrical machine.

A driver of the vehicle 100 requests power for propulsion of the vehicle using an accelerator (accelerator pedal), and an exemplary accelerator 118 is schematically shown in FIG. 1C. The accelerator 118 is movable within a movement region defined by two end positions P1, P2, defining an angular range a. The accelerator 118 position in the movement region can be determined, e.g. by means of a suitable sensor, such as, a potentiometer or an angle sensor 119 or any other suitable kind of sensor which determines the current position of the accelerator 118 in the movement region in which the accelerator is movable. When the accelerator 118 is fully released, i.e. not manoeuvred by the driver, it is in a state of rest in position P1, e.g. by means of a spring force, where position P1 represents a state where no power is requested for propulsion of the vehicle from the vehicle power sources. The electrical machine 110 may still provide a braking power for regeneratively braking the vehicle. Position P2 represents a fully depressed accelerator, corresponding to a request for maximum power for propulsion of the vehicle 100. The portion of the movement region P1-P2 in which a maximum power is considered to be requested may comprise a portion in immediate vicinity to position P2, such as e.g. the portion closest to P2 that correspond e.g. to 5-10% of the total movement region P1-P2. According to embodiments of the invention, the request for maximum power is defined by the vehicle driver pushing the accelerator pedal past a resistance point, activating a mechanical "kick-down" switch, as is known per se. Alternatively e.g. a parameter may be set when the pedal is pushed past a predetermined position, which may represent "kick-down".

As was mentioned above, in general, when a driver of a vehicle 100 of the kind illustrated in FIG. 1A requests a maximum power for propulsion of the vehicle 100, e.g. by fully or substantially fully depressing the accelerator, the vehicle control system controls the powertrain of the vehicle 100 to deliver power to the vehicle drive wheels 113, 114 corresponding to at most the maximum power that the internal combustion engine 101 is capable to deliver. This means that if power is supplied by the electrical machine 110, the internal combustion engine 101 will be controlled to deliver a reduced power, the reduction corresponding to the power contribution from the electrical machine 110 so that the vehicle 100 always behave as expected by the driver, and in the same manner irrespective of whether part of the power is provided by the electrical machine 110, or whether all power is provided by the internal combustion engine 101.

According to the invention, this is controlled in this manner according to at least one drive mode, but where in another drive mode, to the contrary, the electrical machine 110 is allowed to contribute with power for propulsion of the vehicle in addition to the power provided by the internal combustion engine 101 so that the total power applied to the vehicle drive wheels 113, 114 exceeds the maximum power that the internal combustion engine 101 is capable of delivering.

According to the present example, the vehicle comprises a drive mode selector for selecting drive mode of the vehicle. As was mentioned above, vehicles may comprise a drive mode selector for selecting different drive modes. Depending on the selected drive mode, vehicle functions may be adapted to various extents to optimize propulsion of the vehicle on the basis of criteria represented by the selected drive mode.

For example, two or more of an economy mode, a standard mode and a power mode and possible further modes may be selectable by the vehicle driver to adapt propulsion of the vehicle according to preferences of the driver and/or according to otherwise prevailing conditions. According to the present example, a drive mode selector may be utilized to switch between an economy mode, a power mode and a standard mode of operating the vehicle.

As was mentioned above, when economy mode is selected, propulsion of the vehicle may be controlled to reduce fuel consumption at the acceptance of a possible prolonged trip time, where e.g. cruise control systems may be set to allow higher deviations from a set vehicle speed than in other driving modes to allow the vehicle to lose speed to a higher extent when going uphill in order to possible regain the speed at the influence of the force of gravity when going downhill to thereby reduce fuel consumption.

With regard to the normal, standard, driving mode, this mode may, as indicated above, constitute a balanced trade-off, where some fuel efficiency may be traded off for higher performance e.g. to provide a good hill-climbing performance and possibly also reduce vehicle trip time in comparison to when propelling the vehicle in economy mode.

According to the present example, when power mode is selected, the vehicle propulsion may be controlled in a manner where power for propelling the vehicle is prioritized. In addition, according to the present example, control of total power delivered by the internal combustion engine 101 and electrical machine 110 according to the invention differs from other modes of operation. Also, charging of the energy store 111 may differ in power mode from other modes.

In addition to the exemplified modes, additional modes may also be present and selectable by the driver.

The person skilled in the art will appreciate that a method for controlling power delivered by the power sources of the vehicles according to the present invention may be implemented in a computer program, which, when it is executed in a computer, instructs the computer to execute the method. The computer program is usually constituted by a computer program product stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc., and be arranged in or in connection with a control unit/system/means, whereupon the computer program is executed by the control unit/system/means. The behaviour of the vehicle, such as the power delivered by the power sources in response to a driver request for power, in a specific situation can thus be adapted by modifying parameters using the instructions of the computer program.

A plurality of the functions of a vehicle, such as controlling vehicle power sources based on driver requests are, in general, controlled by control means such as e.g. a control system and/or a control unit. Control systems in modern vehicles commonly comprise communication bus systems including one or more communication buses for linking a number of electronic control units (ECU's), or means or controllers, and various components located on the vehicle. Such a control system can comprise a large number of control units/means and the responsibility for a specific function can be divided amongst more than one control unit. Vehicles of the shown type thus often comprise significantly more control units than the control units shown in FIG. 1A, which is well known to the person skilled in the art within this technical field. The control units/means 112, 115-116 of FIG. 1A may hence communicate with one another via the communication bus system, partly indicated by interconnecting lines in FIG. 1A. When a method according to embodiments of the invention is implemented in a control unit/means e.g. of the exemplified kind this may hence be accomplished using a computer program stored on storage means of the control unit/means and being executed by executing means of the control unit/means. A method according to embodiments of the invention may also be implemented using a combination of a plurality of computer programs, which may be implemented in a same or different control units/means. A vehicle control system may also comprise only a single control unit/means carrying out the various control system functions of the vehicle.

The present invention can be implemented in any suitable control unit/control means, and, according to the illustrated example, the invention is implemented in control unit/means 112 for controlling the hybrid drive portion of the vehicle 100. The invention may, however, also be implemented in any other suitable control unit/means and/or combination of control units/means. The control of vehicle deceleration using the electrical machine 110 according to the present invention will usually depend on signals being received from other control units/means and/or vehicle components, and it is generally the case that control units/means of the disclosed type are normally adapted to receive sensor signals from various parts of the vehicle 100. The control unit/ means 112 will, for example, receive control signals representing driver requests for torque. Control units/means of the illustrated type are also usually adapted to deliver control signals to various parts and components of the vehicle, e.g. to means controlling power supply of the electrical machine and/or other control units/means of the control system of the vehicle.

Figure 1B:
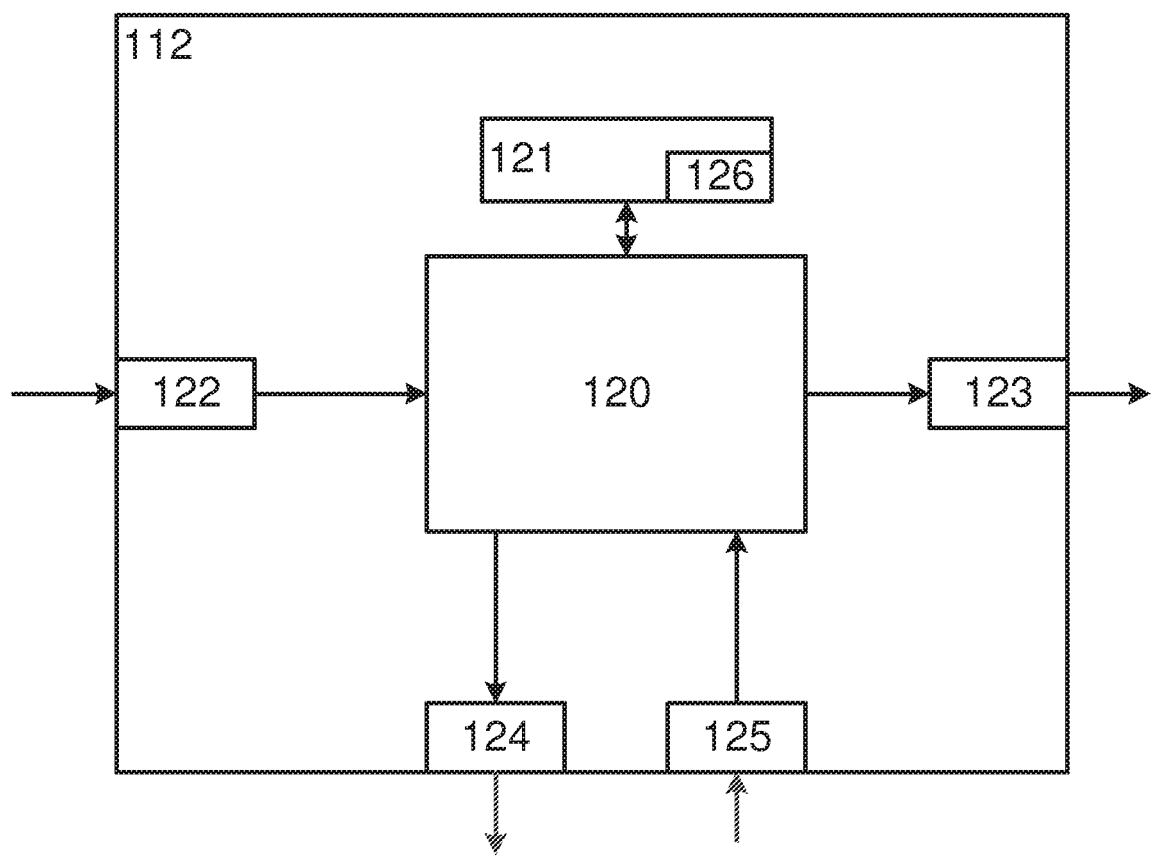
FIG. 1B illustrates an example of a control unit/means in a vehicle control system.

An exemplary control unit/means (the control unit/means 112) forming part of, or constituting, the vehicle control system is schematically shown in FIG. 1B, wherein the control unit/means comprise a computing unit 120, which can comprise, for example, any suitable type of processor or microcomputer, such as a circuit for digital signal processing (Digital Signal Processor, DSP) or a circuit having a predetermined specific function (Application Specific Integrated Circuit, ASIC). The computing unit 120 is connected to a memory unit 121, which provides the processing unit 120, with e.g. the stored program code 126 and/or the stored data that the computing unit 120 requires to be able to perform calculations. The computing unit 120 is also arranged so as to store partial or final results of computations in the memory unit 121.

Furthermore, the control unit/means 112 is provided with devices 122, 123, 124, 125 for receiving and transmitting input and output signals. These input and output signals can comprise waveforms, impulses or other attributes that can be detected as information and can be converted into signals which can be processed by the computing unit 120. These signals may then be made available to the computing unit 120. The devices 123, 124 for transmission of output signals are arranged to convert signals received from the processing unit 120 in order to create output signals by, for example, modulating the signals, which can be transmitted to other parts of and/or systems of the vehicle. Each of the connections to the devices for receiving and transmitting input and output signals may comprise of one or more of a cable; a data bus, such as a CAN bus (Controller Area Network bus), a MOST bus (Media Oriented Systems Transport) or any other bus configuration, or a wireless connection. A person skilled in the art will appreciate that the claimed system, or part of the claimed system may comprise the control unit/means 112 where means of the claimed system may comprise the computing unit 120.

A method 200 according to embodiments of the invention is illustrated in FIG. 2. As was mentioned, according to the present example the vehicle comprises a drive mode selector for selecting drive mode of the vehicle, and depending on the selected drive mode vehicle functions are adapted to various extents to tune propulsion of the vehicle on the basis of criteria represented by the selected drive mode.

According to the present example, the total power delivered by the vehicle power sources is only allowed to exceed the maximum deliverable power of the internal combustion engine 101 when the power mode, here denoted M2, is selected. That is, the total applied power may not be allowed to exceed the maximum deliverable power of the internal combustion engine even if power is applied by the electrical machine when another drive mode is selected.

However, as was mentioned, according to embodiments of the invention, the total power delivered by the vehicle power sources upon a request for maximum power may be allowed to exceed the maximum deliverable power of the internal combustion engine 101 also when another mode is selected.

The method starts in step 201, where, therefore, it is determined whether the driver of the vehicle 100 has selected power mode M2 using the drive mode selector.

According to embodiments of the invention, it is required that the driver actively selects the power mode, e.g. by manoeuvring a drive mode selector or selecting the power mode e.g. on a display of the vehicle. The method remains in step 201 for as long as this is not the case. When it is determined that the driver has set the drive mode selector in power mode, the method continues to step 202.

In step 202, it is determined whether the driver requests maximum power from the internal combustion engine 101. As was mentioned above, the driver may request maximum power e.g. by fully depressing the accelerator 118 such that a kickdown-switch is activated, or depressing the accelerator 118 at least to a first extent. In case the driver requests maximum power the method continues to step 211, while otherwise the method continues to step 203. In step 203, i.e. in a situation where maximum power is not requested, it is determined whether the energy store 111 is fully charged. That is, it is determined whether the energy store 111 may be further charged using the electrical machine 110, or whether the energy store 111 is charged to a state where any energy recovered by the electrical machine 110 may have to be dissipated e.g. as heat and hence may not be desired. According to embodiments of the invention, it may be determined in step 202 whether the driver in power mode requests a power that is lower than maximum power, but at least a predetermined power, in which case the method may also continue to step 211 from step 202. This predetermined power may, for example, be a power exceeding, or exceeding a predetermined proportion of, the power that can be delivered by the internal combustion engine 101.

Also, it may be determined whether the request for power indicates that the current driving resistance is to be overcome, which may be determined e.g. by the degree to which the accelerator is depressed, and in which case the method may continue to step 211.

If it is determined that the energy store is fully charged, the method may return to step 202 in order to again determine if maximum power is requested. Alternatively, the method may return to step 201 to determine if power mode is still selected by the driver. The method may return to step 202 via a step 210 where any applied brake force, e.g. applied according to the below, may be discontinued to thereby discontinue any current charging of the energy store 111.

If it is determined that the energy store is not fully charged and may be charged further, the method continues to step 204 where a brake force is applied using the electrical machine 110. The brake force thereby applies a load on the internal combustion engine 101, which forces the internal combustion engine to deliver more power in order to still provide the driver requested propelling power on the vehicle drive wheels when the additional load applied by the electrical machine 110 is taken into consideration. The additional load applied by the electrical machine 110 is used for recovering mechanical energy delivered by the internal combustion engine 101 which is then converted into electrical energy using the electrical machine 110, and where the electrical energy generated from mechanical energy delivered by the internal combustion engine is stored in the energy store 111. In this way, the energy store 111 is charged in order to be able to power the electrical machine 110 when maximum power is requested by the vehicle driver.

When the brake force has been applied the method may return to step 202 to determine if the driver, with the power mode activated, has changed the request for power to request a maximum power from the internal combustion engine 101. For as long as this is not the case and for as long as the energy store is not fully charged the brake force make continuously be applied by the electrical machine 110 to charge the energy store in preparation for energy usage using a request for maximum power.

If it is determined in step 202 that the driver requests a maximum power from the internal combustion engine, e.g. by fully depressing the accelerator or depressing the accelerator to an extent being determined to represent the request for maximum power of the internal combustion engine 101, the method continues from step 202 to step 211 where, similar to in step 210, any brake torque applied by the electrical machine 110 is discontinued. The method then continues to step 205, where it is determined if the energy store 111 is sufficiently charged to provide additional power. According to embodiments of the invention, it is determined that the energy store is sufficiently charged provided there is a usable charge level remaining in the energy store 111, i.e. energy that can be used to propel the electrical machine 110. According to embodiments of the invention, it is determined that a sufficient charge level prevails if the energy store is charged at least to a predetermined extent. For example, it can be determined that the energy store is sufficiently charged if the electrical machine can be controlled to deliver a predetermined power for a predetermined period of time, such as e.g. a for predetermined number of seconds or any other suitable period of time.

If it is determined in step 205 that there is not sufficient energy stored in the energy store 111 to power the electrical machine 110 to a desired extent, the method is ended in step 209. If, on the other hand, it is determined in step 205 that there is sufficient energy stored in the energy store 111 to power the electrical machine 110, the method continues to step 206. In step 206 at least the electrical machine 110 is controlled to deliver a power such that the total power delivered by the internal combustion engine 101 and the electrical machine 110 exceeds the maximum deliverable power of the internal combustion engine 101.

According to embodiments of the invention, the electrical machine 110 is controlled to deliver maximum deliverable power, but according to embodiments of the invention, the electrical machine 110 is controlled to deliver less than maximum of its deliverable power. When the electrical machine 110 is controlled to deliver less than maximum of its deliverable power, power may be e.g. applied during a longer period of time prior to the energy store is being drained, and the additional power thereby no longer can be applied. According to embodiments of the invention, the power applied by the electrical machine 110 is controlled in dependence of the power that currently is being delivered by the internal combustion engine 101, so that e.g. a substantially constant total power can be delivered.

For example, the power delivered by the electrical machine 110 can be controlled such that the total combined power that is delivered by the internal combustion engine 101 and the electrical machine 110 is controlled towards a predetermined combined power, where the electrical machine 110 can be controlled to deliver more power when the internal combustion engine delivers less, and vice versa.

If the total power delivered by the vehicle power sources is controlled to be essentially the same each time maximum power is requested by the driver, the vehicle behaviour will also be perceived as being consistent.

In addition to controlling power delivered by the electrical machine 110, the power delivered by the internal combustion engine may also be controlled. For example, it can be determined whether the internal combustion engine will deliver more power by performing a change of gear to a lower gear. This may oftentimes be the case since a change of gear increases the speed of rotation of the internal combustion engine which thereby may increase the power delivered by the internal combustion engine. In case it is determined that a change of gear may be performed to more than one lower gear to increase power delivered by the internal combustion engine 101, a change of gear may be performed to the gear at which the highest, or maximum, power can be delivered by the internal combustion engine, or a gear at which the internal combustion engine can deliver a high power for the longest period of time prior to a further change of gear is expected to be required.

When power has been applied by the electrical machine 110 such that the total power delivered by the internal combustion engine 101 and the electrical machine 110 exceeds the maximum deliverable power of the internal combustion engine 101, the method continues to step 207, where it is determined if the power delivered by the electrical machine 110 is to be reduced. This can be the case, for example, if the energy level in the energy store falls below a predetermined minimum level, so that there no longer is power available to power the electrical machine 110. Alternatively, or in addition, as indicated above, the power boost provided by the electrical machine 110 can be arranged to be performed for only a limited time, such as a predetermined number of seconds. In this way the driver will have a feel for how long the additional power will be available, and will not be surprised when the power is reduced. The applied power may also be reduced e.g. if the driver releases the accelerator so that maximum, or any, power is no longer requested. The electrical machine 110 is controlled to deliver power according to the above for as long as it is not determined that power is to be reduced. When it is determined that power is to be reduced the method continues to step 208, where the power applied by the electrical machine is reduced such that the total power delivered by the internal combustion engine 101 and electrical machine 110 no longer exceeds the maximum deliverable power of the internal combustion engine 101. According to embodiments of the invention, the electrical machine 110 is then controlled to stop completely providing power for propelling the vehicle 100.

The invention has several advantages.

For example, when the driver becomes aware of an upcoming desired for higher power, the power mode may be selected to commence charging of the energy store 111 in case this is insufficiently charged. When the actual need for power then arises, the probability of sufficient energy in the energy store may be higher than if no charging had been applied. The driver may, for example, activate the power mode when an uphill section of road is upcoming to reduce the risk of the vehicle losing speed when climbing the uphill section of road. Also, the driver may activate power mode e.g. when the driving situation is such that the vehicle performs overtakings of other vehicles, and where it may be desirable to complete an overtaking in a shorter period of time by utilizing the increased power to obtain faster acceleration of the vehicle.

This is illustrated in FIGS. 3A-C. FIG. 3A illustrates the vehicle 100 travelling a long a road 301. FIG. 3B illustrates the power delivered by the internal combustion engine 101 when the vehicle 100 is travelling along the road 301. FIG. 3C illustrates correspondingly the power delivered by the electrical machine 110 when the vehicle 300 is travelling along the road 301.

Prior to the driver of the vehicle 100 selects power mode, the internal combustion engine 101 delivers a power PICE1, which is sufficient to propel the vehicle 100 for as long as the road 301 is relatively level. The electrical machine delivers essentially zero power at this stage. When the vehicle reaches position L1, the driver selects power mode in preparation for climbing a hill 302 commencing at position L2. According to the present example it is then determined in step 203 that the energy store 110 can be further charged, and a braking, negative, power PCHARGE is therefore applied by the electrical machine 110 when power mode is selected to charge the energy store 111. This negative load is compensated for by the internal combustion engine 101 which is simultaneously controlled to deliver a power PICE1+PCHARGE so that the power applied to the vehicle drive wheels remain the same, however with the difference that the energy store 111 is being charged.

When the vehicle 100 reaches the beginning of the uphill section of road 302, the driver requests maximum power e.g. by performing a conventional kick-down, e.g. activating a kickdown-switch, at position P2, and since charging has been in progress up to position L2 the electrical machine 110 is controlled to stop applying a braking power. In addition the internal combustion engine 101 is controlled to deliver maximum power, and the electrical machine is controlled to apply a propelling power PEM so that the total propelling power of the vehicle 101 becomes PMAX_ICE+PEM_BOOST. In this way, the vehicle may appear more powerful to the driver in power mode than in other modes.

With regard to the status of the energy store, this may, according to embodiments of the invention, be communicated to the driver of the vehicle, e.g. through suitable indication in the dashboard/instrument cluster of the vehicle. For example, the driver may be notified when power mode is selected whether or not there is sufficient power to boost propulsion of the vehicle using the electrical machine 110. The indication may also be arranged to always be present, so that the driver may select power mode at an earlier point in time in case the charging status of the energy store 111 is currently insufficient.

Furthermore, the status of the energy store may be presented to the driver e.g. using a bar graph or other suitable graphical means indicating the level of charging. The level may be arranged to be continuously updated both when charging and when using the energy for propelling the electrical machine 110, e.g. as an increasing/decreasing bar. Also, e.g. the currently used power level of the electrical machine 110, and/or the total power delivered to the vehicle drive wheels may be displayed, where e.g. 100% may indicate the maximum deliverable power of the internal combustion engine, so that more than 100% power may be indicated to the driver.

The driver may also be presented e.g. a timer or other time indicator, e.g. indicating the remaining time that boost will be available at the current power level being delivered by the electrical machine, so that the driver may not be surprised when the additional power no longer can be delivered. Information regarding charge status, power levels and boost times may also be presented to the driver in various other manners.

When the hill has been climbed, at position L3, the power delivered by the electrical machine 110 can be reduced, and e.g., since the power mode is still activated, again apply a braking force acting on the internal combustion engine 101. Similarly, the power delivered by the internal combustion engine 101 can be reduced to the power that currently is required to propel the vehicle 100 with the addition of the power required to meet the load applied by the electrical machine 110. This is illustrated starting from time L3 in FIG. 3A-C. If the driver then switches driving mode, e.g. to normal mode, the system may return to the state prevailing prior to the power mode was activated, so that the electrical machine discontinues to apply a brake force, and the power delivered by the internal combustion engine is reduced to the power currently required to propel the vehicle, this is illustrated from time L4.

According to the disclosed example, the energy in the energy store is sufficient for powering the electrical machine 110 throughout the uphill section of road. This may, however, not be the case, e.g. if the uphill section of road is long. Also, as was mentioned, the power boost provided by the electrical machine 110 may be arranged to only be provided for a predetermined period of time irrespective of whether it would actually be possible to boost the vehicle for a longer period of time. According to embodiments of the invention, power is only applied if the charging state of the energy store allows additional power to be applied by the electrical machine for a predetermined period of time, e.g. so that the driver always knows what to expect from the propelling capabilities of the vehicle.

The present invention is not limited to the above described embodiments. Instead, the present invention relates to, and encompasses all different embodiments being included within the scope of the independent claims. For example, as exemplified above, the request for power may be a request for power from a driver, but may also be a request for power from a cruise control system.

Also, instead of only controlling power delivered by the internal combustion engine and the electrical machine such that the total power exceeds the maximum deliverable power of the internal combustion engine only in a power mode, this control may be performed for maximum request for power also in other modes.

Also, as explained, the control of power according to the invention may be performed in power mode also in situations where less than maximum power is requested.

The invention claimed is:

1. A method for propelling a vehicle, wherein the vehicle includes:
   a first power source configured to selectively provide a controllable power to propel at least one drive wheel of said vehicle, the first power source being an internal combustion engine; and
   a second power source configured to selectively provide a controllable power to propel at least one drive wheel of said vehicle, the second power source comprising at least one electrical machine,
   wherein the vehicle is configured to be selectively driven according to a first mode and a second mode, where, when said vehicle is driven in said second mode, providing power for propelling said vehicle is prioritized over fuel efficiency than when said vehicle is driven according to said first mode,
   wherein the method comprises:
      detecting a request for maximum power for propelling said vehicle;
      determining whether said vehicle is being driven according to said second mode; and
      if said vehicle is being driven according to said second mode, controlling power delivered by said first power source and said second power source such that the total power delivered by said first and said second power source exceeds a maximum deliverable power of said first power source.

2. A method according to claim 1, wherein, when a request for maximum power for propelling said vehicle is detected:

controlling power delivered by said first power source and said second power source such that the total power delivered by said first and said second power source exceeds the maximum deliverable power of said first power source when said vehicle is being driven according to said first mode.

3. A method according to claim 1, wherein:
controlling power delivered by said first power source and said second power source such that the total power delivered by said first and said second power source exceeds the maximum deliverable power of said first power source only when said vehicle is being driven according to said second mode.

4. A method according to claim 1, further including, when said vehicle is being driven according to said second mode:
controlling power delivered by said first power source and said second power source such that the total power delivered by said first and said second power source exceeds the maximum deliverable power of said first power source when a power that is less than maximum power for propelling said vehicle is requested.

5. A method according to claim 1, the vehicle including an energy store, wherein energy of said energy store powers said second power source when said second power source provides a propelling power to said at least one drive wheel, and where the second power source charges the energy store when applying a braking force, the method further comprising, when said second mode is selected:
determining if a lower power than the maximum deliverable power of said first power source for propelling said vehicle is requested, and
when a lower power than the maximum deliverable power of said first power source is requested, controlling said second power source to apply a braking force for charging said energy store.

6. A method according to claim 1, further comprising, when said vehicle is being driven according to said second mode:
determining if a change of gear to a lower gear increases the total deliverable power of said first power source and said second power source at a current vehicle speed; and
changing to said lower gear when a change of gear to said lower gear increases said total deliverable power at the current vehicle speed.

7. A method according to claim 6, further including, when a change of gear to any one of plurality of lower gears increases deliverable power of said first power source at a current vehicle speed:
changing to a gear of said plurality of gears where deliverable power of said first power source is highest at the current vehicle speed; and/or
changing to a gear of said plurality of gears where a higher delivered power of said first power source is estimated to be maintained for a longer period of time in comparison to at least one other of said plurality of gears.

8. A method according to claim 1, further including:
controlling said second power source to deliver a power being less than the maximum deliverable power of said second power source.

9. A method according to claim 1, further comprising, when said vehicle is being driven according to said second mode:
controlling power delivered by said first power source and said second power source such that the total power delivered by said first power source and second power source exceeds the maximum deliverable power of said first power source when driver maneuverable means is maneuvered to a position representing a request a maximum power from said first power source.

10. A method according to claim 1, further comprising, when said vehicle is being driven according to said second mode:
controlling power delivered by said second power source such that the total power delivered by said first power source and said second power source exceeds the maximum deliverable power of said first power source only if an energy level of an energy store is sufficient to provide at least a first power of said second power source for at least a predetermined period of time.

11. A method according to claim 1, wherein:
the total power delivered by said first and second power source is controlled to at most equal the maximum deliverable power of said first power source when the vehicle is driven according to said first mode.

12. A method according to claim 1, the vehicle including driver controllable means for actively requesting power for propelling the vehicle, and wherein said request for power for propelling the vehicle is a driver request for a maximum power for propelling said vehicle.

13. A method for propelling a vehicle, wherein the vehicle includes:
a first power source configured to selectively provide a controllable power to propel at least one drive wheel of said vehicle, the first power source being an internal combustion engine; and
a second power source configured to selectively provide a controllable power to propel at least one drive wheel of said vehicle, the second power source comprising at least one electrical machine,
wherein the vehicle is configured to be selectively driven according to a first mode and a second mode, where, when said vehicle is driven in said second mode, providing power for propelling said vehicle is prioritized more in relation to fuel efficiency of said vehicle than when said vehicle is driven according to said first mode,
wherein the method comprises, when a maximum power for propelling said vehicle is requested and said vehicle is being driven according to said second mode, controlling power delivered by said first power source and said second power source such that the total power delivered by said first and said second power source exceeds a maximum deliverable power of said first power source, such that a combination of the power delivered by the first and second power source is controlled towards a predetermined power level.

14. A method for propelling a vehicle, wherein the vehicle includes:
a first power source configured to selectively provide a controllable power to propel at least one drive wheel of said vehicle, the first power source being an internal combustion engine; and
a second power source configured to selectively provide a controllable power to propel at least one drive wheel of said vehicle, the second power source comprising at least one electrical machine,
wherein the vehicle is configured to be selectively driven according to a first mode and a second mode, where, when said vehicle is driven in said second mode, providing power for propelling said vehicle is prioritized more in relation to fuel efficiency of said vehicle than when said vehicle is driven according to said first mode, wherein the method comprises, when a maximum power for propelling said vehicle is requested and said vehicle is being driven according to said second mode, controlling power delivered by said second power source such that the total power delivered by said first power source and said second power source exceeds the maximum deliverable power of said first power source at least and/or at most during a predetermined period of time from when maximum power of said first power source is requested.

15. A computer program product comprising computer program code stored on a non-transitory computer-readable medium, said computer program product used for propelling a vehicle, wherein the vehicle includes:

a first power source configured to selectively provide a controllable power to propel at least one drive wheel of said vehicle, the first power source being an internal combustion engine; and a second power source configured to selectively provide a controllable power to propel at least one drive wheel of said vehicle, the second power source comprising at least one electrical machine, wherein the vehicle is configured to be selectively driven according to a first mode and a second mode, where, when said vehicle is driven in said second mode, providing power for propelling said vehicle is prioritized over fuel efficiency than when said vehicle is driven according to said first mode, said computer program code comprising computer instructions to cause one or more control units to perform the following operations:

detecting a request for maximum power for propelling said vehicle;

determining whether said vehicle is being driven according to said second mode; and if said vehicle is being driven according to said second mode, controlling power delivered by said first power source and said second power source such that the total power delivered by said first and said second power source exceeds a maximum deliverable power of said first power source.

16. A system for propelling a vehicle, wherein the vehicle includes:

a first power source configured to selectively provide a controllable power to propel at least one drive wheel of said vehicle, the first power source being an internal combustion engine; and a second power source configured to selectively provide a controllable power to propel at least one drive wheel of said vehicle, the second power source comprising at least one electrical machine;

wherein the vehicle is configured to be selectively driven according to a first mode and a second mode, where, when said vehicle is driven in said second mode, providing power for propelling said vehicle is prioritized over fuel efficiency than when said vehicle is driven according to said first mode, wherein the system comprises:

means for detecting a request for maximum power for propelling said vehicle;

means for determining whether said vehicle is being driven according to said second mode; and means configured to, if said vehicle is being driven according to said second mode, control power delivered by said first power source and said second power source such that the total power delivered by said first and said second power source exceeds a maximum deliverable power of said first power source.

* * * * *